United States Patent
Kunzler et al.

(10) Patent No.: US 8,061,767 B2
(45) Date of Patent: Nov. 22, 2011

(54) SEAT WITH 3D MOTION INTERFACE

(75) Inventors: Patrik A. Kunzler, Birmensdorf (CH); Enrique J. Garcia, Saragossa (ES); William J. Mitchell, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 278 days.

(21) Appl. No.: 11/860,497

(22) Filed: Sep. 24, 2007

(65) Prior Publication Data

US 2009/0079243 A1    Mar. 26, 2009

(51) Int. Cl.
*B62J 1/00* (2006.01)
(52) U.S. Cl. .............. 297/201; 297/196; 297/284.3; 297/284.9
(58) Field of Classification Search ............ 297/195.11, 297/196, 198, 201, 284.3, 284.9, 271.1, 271.4, 297/233, 248
See application file for complete search history.

(56) References Cited

U.S. PATENT DOCUMENTS

| | | | | |
|---|---|---|---|---|
| 560,698 | A | * | 5/1896 | Dyer ..................... 297/201 |
| 604,347 | A | * | 5/1898 | Bray ..................... 297/201 |
| 606,818 | A | * | 7/1898 | Best ..................... 297/201 |
| 642,191 | A | * | 1/1900 | Wright ................. 297/201 |
| 4,046,262 | A | | 9/1977 | Vykukal et al. |
| 4,387,925 | A | | 6/1983 | Barker et al. |
| 4,966,413 | A | | 10/1990 | Palarski |
| 5,515,078 | A | | 5/1996 | Greschler et al. |
| 5,529,561 | A | | 6/1996 | Wang et al. |
| 5,577,801 | A | | 11/1996 | Glockl |
| 5,580,128 | A | | 12/1996 | Johnson et al. |
| 5,588,704 | A | | 12/1996 | Harza |
| 5,709,430 | A | * | 1/1998 | Peters .................. 297/201 |
| 5,769,492 | A | | 6/1998 | Jensen |
| 5,863,094 | A | * | 1/1999 | Endo .................... 297/201 |
| 5,913,568 | A | | 6/1999 | Brightbill et al. |
| 6,056,356 | A | * | 5/2000 | Unger, Jr. ............ 297/201 |
| 6,139,095 | A | | 10/2000 | Robertshaw |
| 6,340,207 | B1 | | 1/2002 | Brightbill et al. |
| 6,357,827 | B1 | | 3/2002 | Brightbill et al. |
| 6,398,310 | B1 | | 6/2002 | Seeliger |
| 6,402,235 | B1 | * | 6/2002 | Letendre ............. 297/195.1 |
| 6,550,858 | B1 | | 4/2003 | Grohs et al. |
| 6,595,586 | B2 | | 7/2003 | Brightbill et al. |
| 6,761,400 | B2 | | 7/2004 | Hobson |

(Continued)

FOREIGN PATENT DOCUMENTS

WO    WO-93/19648 A1  * 10/1993

(Continued)

OTHER PUBLICATIONS

Search Report & Written Opinion, issuer: European Patent Ofc, in'tl Patent Appl No. PCT/US2008/077530, Applicant: Massachusetts Institute of Technology, Feb. 4, 2009.

(Continued)

*Primary Examiner* — David Dunn
*Assistant Examiner* — David E Allred
(74) *Attorney, Agent, or Firm* — Stephen Otis (57) ABSTRACT

There is disclosed a seating system which may included a left seat and a right seat independently supported by left and right suspensions systems, respectively. The left and right suspension systems may provide independent vertical, lateral, azimuthal, and longitudinal roll motion of the left and right seats.

13 Claims, 8 Drawing Sheets

U.S. PATENT DOCUMENTS

| | | | |
|---|---|---|---|
| 6,796,928 | B1 | 9/2004 | Christopher et al. |
| 6,817,673 | B2 | 11/2004 | Walker et al. |
| 6,866,340 | B1 | 3/2005 | Robertshaw |
| 6,935,672 | B2 | 8/2005 | Dehart |
| D509,077 | S | 9/2005 | Beermann et al. |
| D513,894 | S | 1/2006 | Juraschek |
| 7,008,017 | B1 | 3/2006 | Wegener |
| 7,096,562 | B1 | 8/2006 | Dehart |
| 7,111,888 | B1 | 9/2006 | Dehart |
| 2001/0042968 | A1 | 11/2001 | Andrews et al. |
| 2003/0073552 | A1 | 4/2003 | Knight |
| 2005/0282633 | A1 | 12/2005 | Nicolas et al. |
| 2010/0123339 | A1* | 5/2010 | Wen .............................. 297/201 |
| 2010/0301646 | A1* | 12/2010 | Chang ...................... 297/195.11 |

FOREIGN PATENT DOCUMENTS

| | | |
|---|---|---|
| WO | WO 03/098419 | 11/2003 |
| WO | WO 2006/119568 | 11/2006 |

OTHER PUBLICATIONS

International Search Report/Written Opinion, PCT/US2008/083867, Apr. 16, 2009.

Kilian, Axel. Thesis "Design Exploration through Bidirectional Modeling of Constraints," Mass. Institute of Technology, dated Feb. 2006, cover, pp. 244-245, 248-249.

* cited by examiner

SEAT WITH 3D MOTION INTERFACE

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

1. Field

This disclosure relates to chairs and seats.

2. Description of the Related Art

Chairs are ubiquitous in modern western society. Chairs are in our houses, in our offices, in social places, in parks, and in vehicles like cars and buses. What constitutes a "comfortable" chair is different for every type of person, depending on their sensibilities and pre-conceived notions about comfort. In order to accommodate a variety of users, high quality office chairs, as well as the seats in high-end automobiles, and others, may provide a number of degrees of freedom to adjust features of the chair such as the height and width of the seat, the angle of the seat and the backrest, the shape of the seat, and the shape of the backrest with particular emphasis on support for the lower back. Massaging, heating, and cooling functions are also seen, as are inflatable lateral support cushions.

There may be a common misconception that being "relaxed" or "comfortable" implies remaining motionless. However, physical discomfort and stress can be caused by inactivity of muscle groups and by unvaried pressure on joints and other body structure. Thus frequent small motions, such as those that occur naturally while sleeping or when sitting in a non-steady environment, may be much more relaxing than remaining motionless.

One degree of freedom that is missing in current chairs and seats is the capability to allow the occupant to move or rotate their pelvis in a coronal or frontal plane. Rocking the pelvis in the coronal plane is a natural motion that occurs during walking and other physical activity. However, current chairs may constrain the pelvis to a fixed horizontal position. Another type of movement that is notably absent when sitting in current chairs is the balancing micro-movements that occur when standing and walking, or when sitting in a non-steady environment such as a boat or vehicle. Furthermore, the angle between the seatback and the sitting surface is fixed or at least cannot be changed at high frequencies as occur during spontaneous back and leg movements.

Throughout this description, elements appearing in figures are assigned three-digit reference designators, where the most significant digit is the figure number and the two least significant digits are specific to the element. An element that is not described in conjunction with a figure may be presumed to have the same characteristics and function as a previously-described element having a reference designator with the same least significant digits.

DETAILED DESCRIPTION

Definitions

The midsagittal plane (also called the median plane) is defined (Merriam Webster Medical Dictionary) as a vertical longitudinal plane that divides a bilaterally symmetrical animal, such as a person, into right and left halves. A coronal plane (also called a frontal plane) is defined as a plane parallel to the long axis of a body and at right angles to the midsagittal plane.

Since the elements of the seating system are typically symmetrical about the midsagittal plane, the reference designators used in the figures may include the suffixes "L" and "R" to indicate mirror-imaged left-side and right-side elements having the same function.

Within this description, a person who may sit on or occupy a chair or seating system will be referred to an "occupant". While the occupant is not shown in many of the figures, certain features of the seating system may be described in terms of an implied occupant.

Within this description, the term "elastically coupled" will be used to indicate that a first element is joined to a second element with a flexible connection that defines and tends to restore a nominal positional relationship between the elements but allows relative motion in at least one direction.

Description of Apparatus

Figure 1:
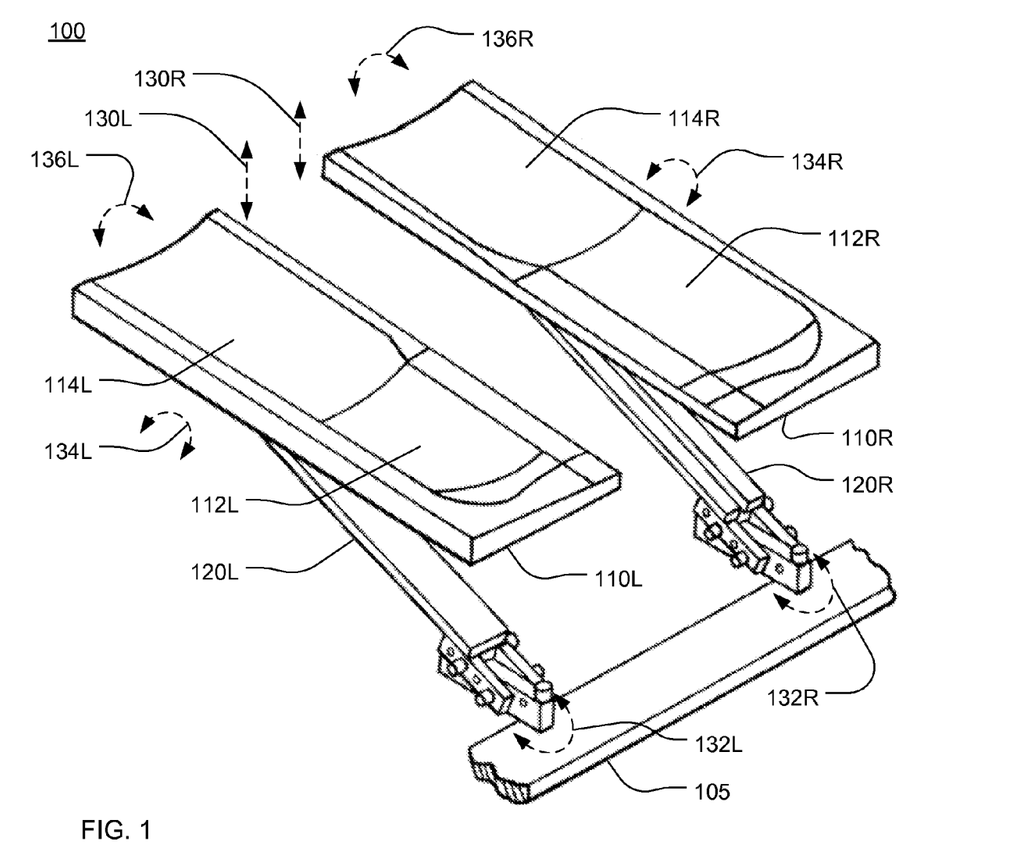
FIG. 1 is a perspective view of a seating system.

Referring now to FIG. 1, a seating system 100 may include a left seat 110L and a right seat 110R. Each of the left and right seats 110L/R may be supported by a corresponding suspension system 120L/R anchored to a common base 105. In FIG. 1, the base 105 is represented as a single structural member. However, the base 105 may include components and elements not shown in FIG. 1. The base 105 may be any known chair base and may include a plurality of legs, casters, a swivel mechanism, and other known structures. The base 105 may be movably or permanently attached to a vehicle, such as an automobile, bus, or boat. The base 105 may be any apparatus suitable to support the seating system 100.

The left and right seats 110L/R may have concave recesses 112L/R to support the buttocks of an occupant. The left and right seats 110L/R may have approximately cylindrical recesses 114L/R to support the thighs of the occupant. The recesses 112L/R and 114L/R may be shallow or may have sufficient depth to provide some degree of lateral support and restraint for the occupant.

The left and right suspension systems 120L/R, which will be subsequently described in additional detail, may allow motion along several axes. The suspension system may allow independent vertical translation or linear motion of the left and right seats 110L/R, as indicated by arrows 130L/R. The suspension system may allow some amount of independent longitudinal roll of the left and right seats 110L/R about separate axes approximately parallel to the long dimension of each seat, as indicated by arrows 136L and 136R.

The suspension system may allow the left and right seats 110L/R to rotate in elevation about separate axes, as indicated by arrows 134L and 134R. The axis for the rotation in elevation of the left and right seats 110L/R may be horizontal. The axis for the rotation in elevation of the left and right seats 110L/R may deviate from horizontal due to the longitudinal roll of the left and right seats 110L/R.

The suspension system may also allow independent azimuthal rotation of the left and right seats 110L/R about separate axes, as indicated by arrows 132L and 132R. The axis for the azimuthal rotation of the left and right seats 110L/R may be approximately vertical. The axis for the azimuthal rotation of the left and right seats 110L/R may deviate from vertical if the seating system is attached to a vehicle, such as an automobile, bus, or boat. The axis for the azimuthal rotation of the left and right seats 110L/R may be roughly aligned with an occupant's hip joints.

Figure 2:
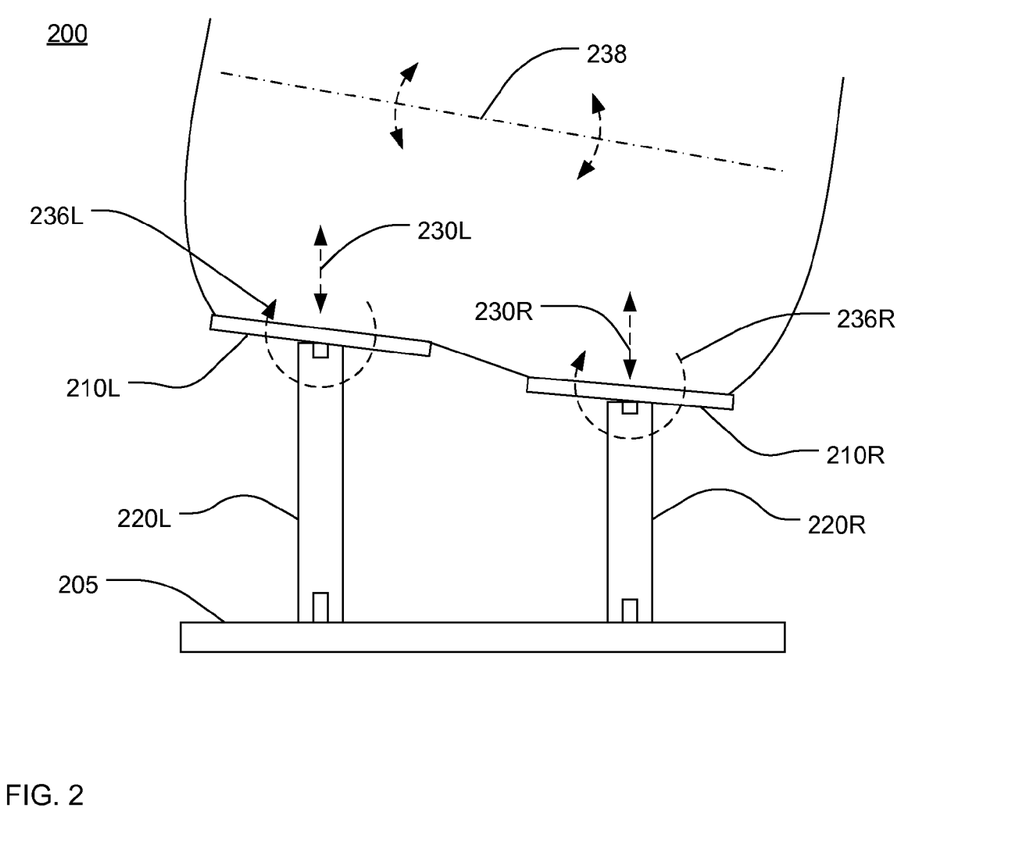
FIG. 2 is a rear view of a seating system.

FIG. 2 shows a rear view of a seating system 200, which may be the seating system 100. A left seat 210L and a right seat 210R are supported from a base 205 by respective suspensions systems 220L and 220R. The suspension systems 220L/R allow independent vertical translation of the seats 210L/R, as indicated by arrows 230L/R. The suspension systems 220L/R may allow independent longitudinal roll of the seats 210L/R, as indicated by arrows 236L/R. Independent vertical and longitudinal motion of the seats 210L/R may allow, and may even encourage, the occupant to rotate their pelvis, represented by the center line 238, in a coronal plane.

Figure 3:
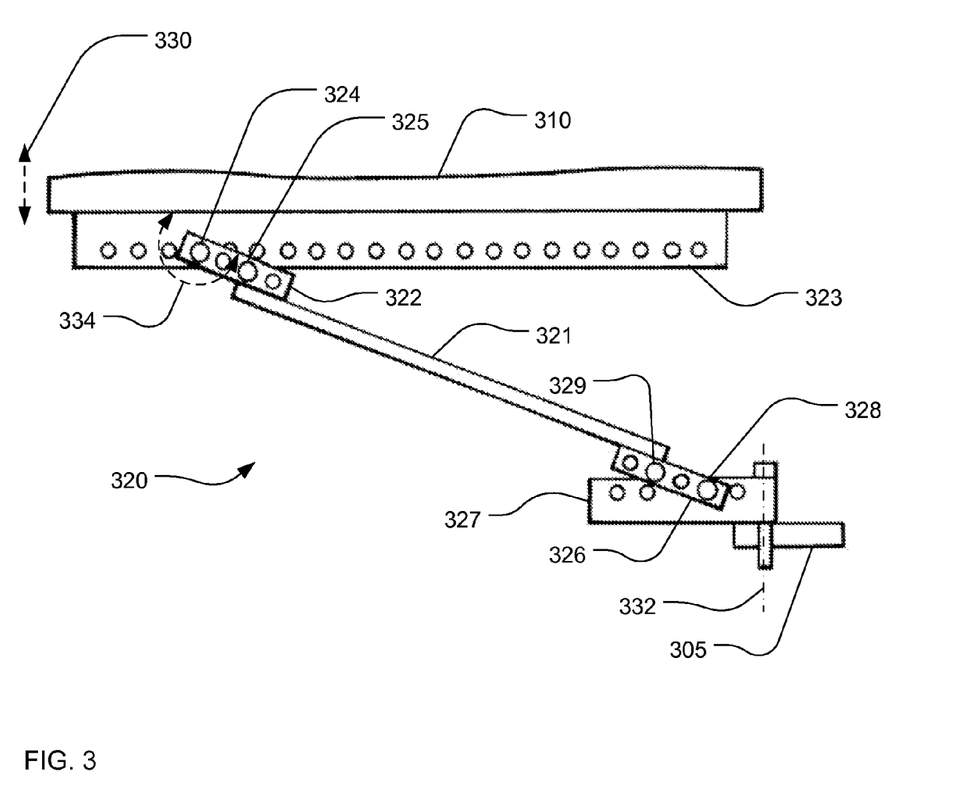
FIG. 3 is a side view of a suspension system.

FIG. 3 shows a side view of an exemplary suspension system 320, which supports a seat 310 above a base 305. The exemplary suspension system 320 may include a flexible element 321, herein called a "flexure", which may bend or flex under the weight of an occupant to allow some degree of vertical translation of the seat 310, as indicated by arrow 330. The flexure 321 may allow longitudinal roll of the seat 210 about an axis approximately parallel to the long dimension of the seat 210. The flexure 321 is essentially a leaf spring that has a nominal shape but may flex or bend away from the nominal shape in response to a force such as the occupant's weight. The flexure 321 may provide a restorative force tending to return the flexure to the nominal shape. The flexure 321 may, depending on the material used for flexure 321, also provide some damping. The flexure 321 may be fabricated from a metal material such as steel or aluminum, from a plastic material such as polycarbonate, or from a composite material such as a graphite fiber composite material. The flexure 321 may include a single leaf (see for example 120L in FIG. 1) or two or more parallel leaves (see for example 120R in FIG. 1). A flexure with two or more leaves may allow greater longitudinal roll of the seat 310. If two or more leaves are used, the relative strength of the leaves may be used to create a bias for motion in one or more directions.

The upper end of flexure 321 may incorporate a link 322 which may be pivotally coupled to the seat 310 using a first pin 324 engaged with a hole in a seat support bar 323, which is attached to the seat 310. The seat 310 may be allowed to rotate or pivot in elevation about the axis of the first pin 324, as indicated by arrow 334. The axis of the first pin may be horizontal, or may deviated from horizontal by the amount of longitudinal roll introduced into the flexure 321. The link 322 and the seat support bar 324 may have multiple holes, such that the overall length of the flexure 321 (which includes link 322) and the position where the flexure 321 engages the seat support bar 323 may be adjusted by relocating the first pin 324. A second pin 325 may be used to determine the at-rest angle of the seat 310 and the range of elevation rotational motion.

The lower end of flexure 321 may incorporate a second link 326 which may be coupled to a third link 327 using a third pin 328. The third link 327 may be pivotally coupled to the base 305, such that the seat 310 and suspension system 320 are free to rotate in azimuth about axis 332. The axis 332 may be roughly in line with an occupant's hip joint. The second link 326 and the third link 327 may have multiple holes, such that the overall length of the flexure 321 (which includes links 326/327) and the position where the flexure 321 engages the base 305 may be adjusted by relocating the third pin 328. A fourth pin 329 may be use to determine the at-rest angle of the flexure 321.

It should be understood that the suspension systems of FIG. 3 is an example of a suspension system for a seating system. Numerous other embodiments of a suspension system may be possible. The other embodiments of a suspension system may include leaf springs, coil springs, and other spring forms; resilient materials; pneumatic or hydraulic cylinders or other types of dampers; hinges, bushings, bearings, and other rotational mechanisms; and combinations thereof.

Other embodiments of a suspension system may allow independent vertical translation of a left seat and a right seat and independent rotation in elevation of the left seat and the right seat about separate axes. The other embodiments may also allow independent azimuthal rotation of the left seat and the right seat about separate axes and independent longitudinal roll of the left seat and the right seat.

Other embodiments of a suspension system may allow a greater or lesser degree of movement compared to the suspension system 320 of FIG. 3. Other embodiments of a suspension system may provide a greater or lesser degree of adjustability compared to the suspension system 320 of FIG. 3. Other embodiments of a suspension system may not allow adjustment, but may be made in a plurality of sizes to accommodate different occupants.

Figure 4:
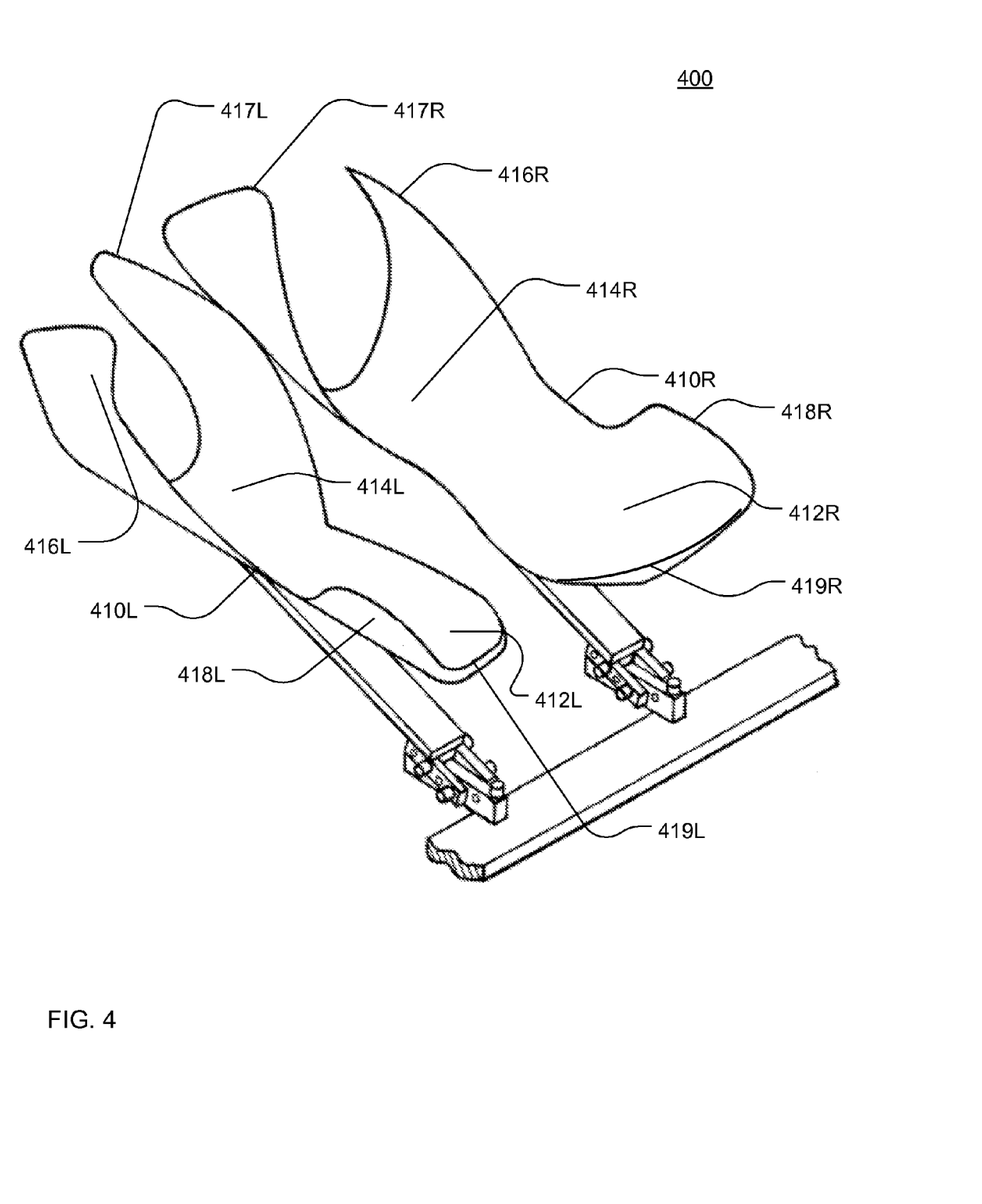
FIG. 4 is a perspective view of a seating system.

Referring now to FIG. 4, a seating system 400 may include a left seat 410L and a right seat 410R having hip supports 418L and 418R, respectively, that provide lateral support and restraint for an occupant's hips. The left seat 410L and the right seat 410R may also have posterior hip and/or buttock supports 419L and 419R, respectively, that provide additional support for an occupant's hips and to restrain the occupant's hips and/or buttocks from sliding too far back on the seats 410L/R. Each seat 410L/R may also include inner thigh supports 417L/R and outer thigh supports 416L/R. The inner and outer thigh supports may support and, to at least some degree, constrain an occupant's thighs. The inner and outer thigh supports may also provide tactile feedback to the occupant. The inner thigh being more sensitive than the outer thigh, and touch and vibration to the inner thigh being sensed as emotionally positive, the inner thigh supports 417L/R and the outer thigh supports 416L/R may provide an enhanced sense of occupant wellbeing. The inner thigh supports 417L/R and the outer thigh supports 416L/R may also provide an enhanced capability for an occupant to detect vehicle information (tactile feedback) or other inputs compared to seating systems that touch only the outer thigh or that don't touch the thighs on their sides at all, like conventional seats.

Figure 5:
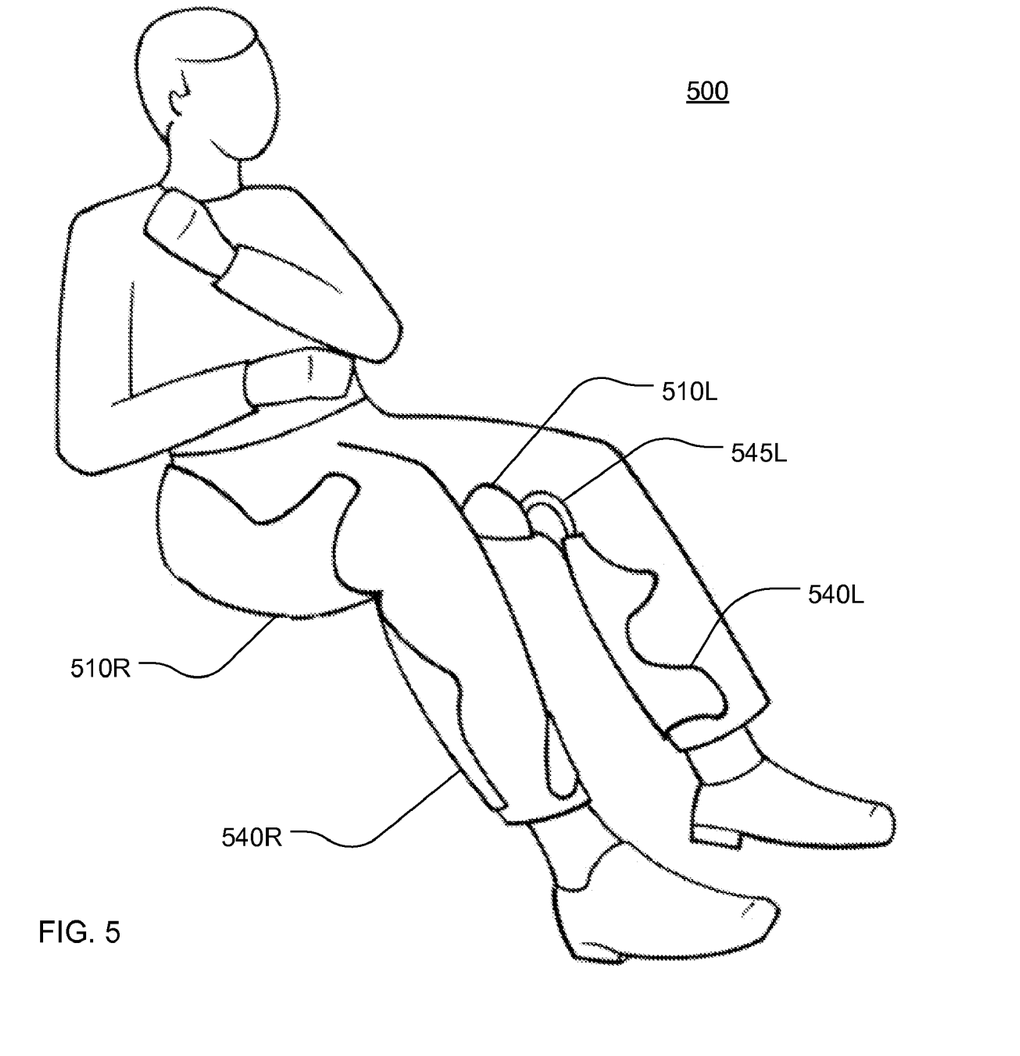
FIG. 5 is a perspective view of a person occupying a seating system with leg supports.

Referring now to FIG. 5, a seating system 500 may include a left lower leg support 540L and a right lower leg support 540R. The left lower leg support 540L may be elastically coupled to the left seat 510L by a flexure 545L located proximate to the inner side of the occupant's left knee. The right lower leg support 540R may be elastically coupled to the right seat 510R by a similar flexure (not visible) located proximate to the inner side of the occupant's right knee. The right and left lower leg supports 540R/L may be elastically coupled to the right and left seats 510R/L, respectively by other mechanisms including flexures located on the outside of the occupant's knees, flexures on both the inside and outside of the occupants knees, hinges, hinges in combination with springs and/or dampers, and other mechanical structures. The left and right lower leg supports 540L/R may support and, to at least some degree, constrain an occupant's lower legs. The left and right lower leg supports 540L/R may also provide tactile feedback to the occupant.

Figure 6:
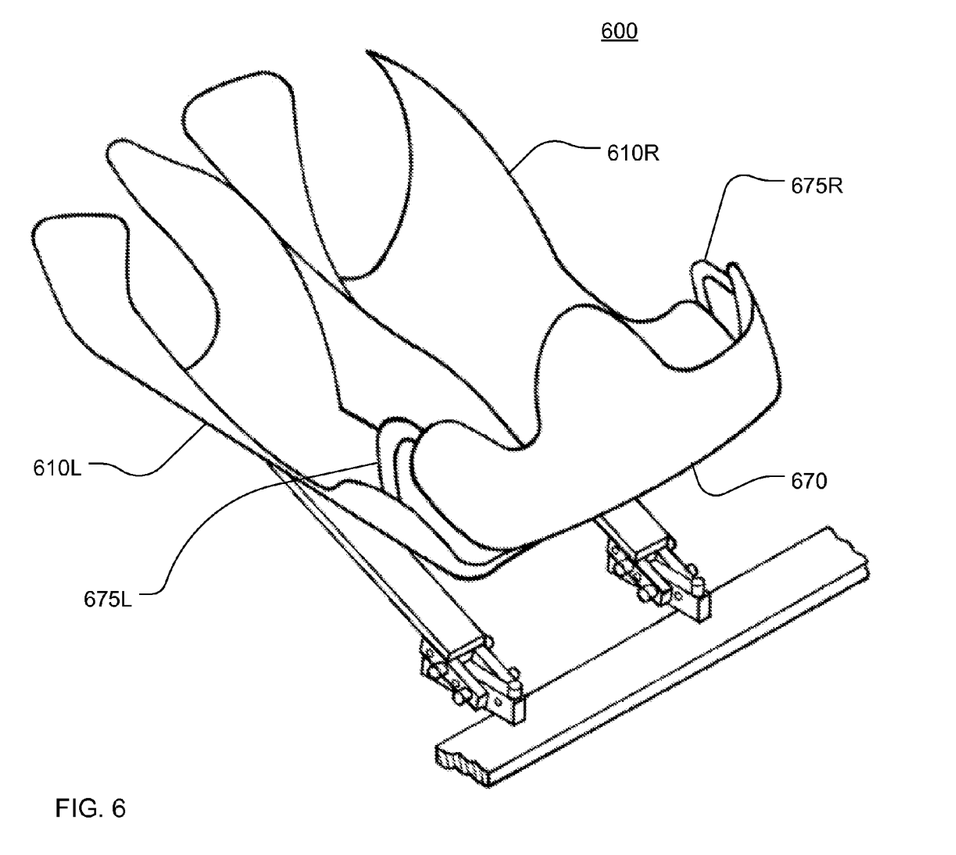
FIG. 6 is a perspective view of a seating system with a lower back support.

Referring now to FIG. 6, a seating system 600 may include a lower back support such as lower back support 670. The lower back support 670 may be elastically coupled to the left seat 610L by a first flexure 675L. The lower back support 670 may be elastically coupled to the right seat 610R by a second flexure 675R. The lower back support 670 may be elastically coupled to the right and left seats 610R/L, respectively by other mechanisms including additional flexures, hinges, hinges in combination with springs and/or dampers, and other mechanical structures. The lower back support 670 may have a variety of shapes other than that illustrated in FIG. 6. The lower back support 670 may wrap partially around the occupant's sides, as shown in FIG. 6. The lower back support 670 may support and, to at least some degree, constrain an occupant's lower back and waist.

Figure 7:
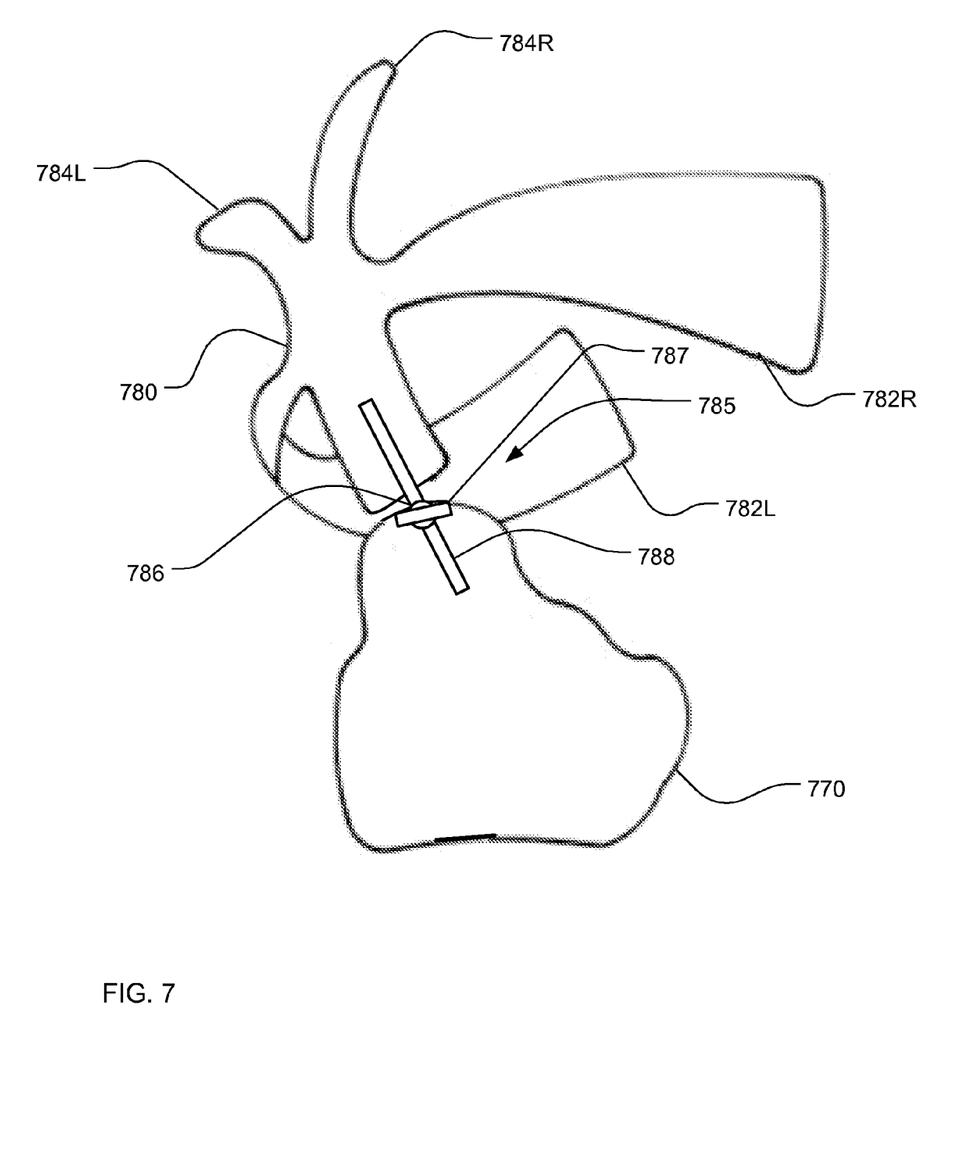
FIG. 7 is a perspective view of a seating system with a lower back support and an upper back support.

Referring now to FIG. 7, a seating system 700 may include a lower back support 770 and an upper back support 780. The upper back support 780 may be movably coupled to the lower back support. The movable coupling of the upper back 780 support to the lower back support 770 may allow free angular and linear motion of the upper back support 780 with respect to the lower back support 770. For example, the upper back support 780 may be movably coupled to the lower back support by a telescoping ball-and-socket joint 785. The telescoping ball-and-socket joint may include a bushing/retainer 787 attached to the lower back support 770. A ball 786 may be free to rotate within the bushing/retainer 787. A shaft 788 may be attached to the upper back support 780. The shaft 788 may be free to move linearly through a bushing within the ball 786. The shaft 788 may move through the ball 786 when, for example, an occupant leans forward and backward. The telescoping ball and socket joint may include soft or hard stops (not shown) to limit the rotation of the ball 786 and to limit the linear motion of the shaft 788. The telescoping ball and socket joint may also include springs and/or damping mechanisms affecting either or both the rotational or linear motion.

The upper back support 780 may include side extensions 782R and 782L that wrap, at least partially, around an occupant's torso under their arms. The upper back support may include upper extensions 784L/R that may wrap, at least partially, over the top of the occupant's shoulders. The lower back support 770 and the upper back support 780 may have a variety of shapes other than that illustrated in FIG. 7. The upper back support 780 may support and, to at least some degree, constrain an occupant's upper back and torso.

An upper back support, such as upper back support 780, that supports the occupant's torso may provide shoulder support without constraining shoulder movement, since the occupant's shoulders are attached to the ribcage in a flexible manner. Supporting the torso without constraining shoulder motion may also provide enhanced occupant comfort and better freedom of movement of the shoulder.

Figure 8:
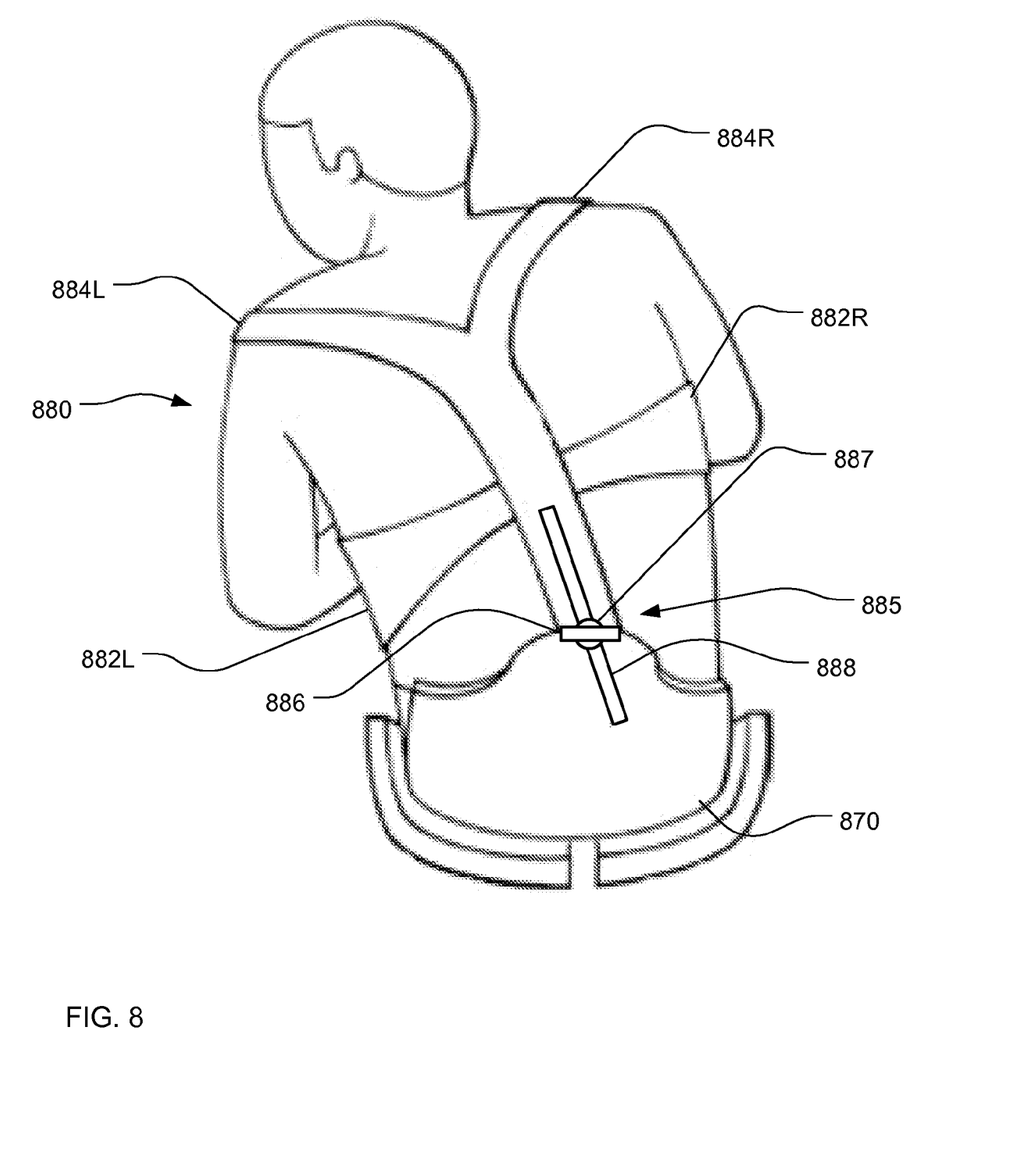
FIG. 8 is a rear view of a person occupying a seating system having a lower back support and an upper back support.

FIG. 8 shows a person occupying a seating system 800 having a lower back support 870 and an upper back support 880. FIG. 8 does not show a suspensions system.

A seating system, such as the seating systems 100, 400, 500, 600, or 700 described herein, may be used as a piece of furniture, and may be particularly suited for use in situations where an occupant desires or is expected to sit for a prolonged period without substantial motion. A seating system as described herein may be applicable for use in an office; in an entertainment or sports venue such as a theater, auditorium, or stadium; or in a vehicle such as a passenger seat in a commercial aircraft.

A seating systems as described herein may also be used, possibly with the addition of one or more belts or straps or other restraint mechanisms, as a protective restraining device that allows substantial occupant motion but prevents potential dangerous motions. For example, a seating system as described herein may be used as a protective child's seat that may allow substantial and pleasurable motion of the child's body and limbs while restraining the child in the event of an accident or sudden stop. As an additional example, a seating system as described herein may be used as a protective seat for a pilot or for the driver of a race car or other high-performance vehicle.

A seating system as described herein may also be used as an exercise device, where the term "exercise device" is intended to encompass devices used for rehabilitation, training and exercise. For example, a seating system as described herein could be employed to improve an occupant's balance or to allow rehabilitation of an occupant's range of joint motion with minimal or controlled stress on the occupant's joints.

A seating system as described herein may be used in applications, such as photography or video/film recording, where it desirable to place an occupant in a position or to perform movements that would be otherwise unsustainable. For example, a seating system may be used to support an actor in front of a neutral "blue screen" background to film motion sequences that may be subsequently combined with other images.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

For means-plus-function limitations recited in the claims, the means are not intended to be limited to the means disclosed herein for performing the recited function, but are intended to cover in scope any means, known now or later developed, for performing the recited function.

As used herein, "plurality" means two or more.

As used herein, a "set" of items may include one or more of such items.

As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

As used herein, "and/or" means that the listed items are alternatives, but the alternatives also include any combination of the listed items.

It is claimed:

1. A seating system comprising, in combination:
a left seat,
a right seat,
a base,
a first elongate flexible support member having first and second longitudinal ends, the first flexible support member pivotally connected to the left seat by a first joint at or adjacent to the first longitudinal end and to the base by a second joint at or adjacent to the second longitudinal end, and
a second elongate flexible support member having third and fourth longitudinal ends, the second flexible support member pivotally connected to the right seat by a third joint at or adjacent to the third longitudinal end and to the base by a fourth joint at or adjacent to the fourth longitudinal end,
wherein:
the left and right seats are adapted to be simultaneously sat upon by a single human,
the second joint allows independent rotation of the left seat about a first axis, the first axis being a straight line in a vertical direction that intersects the second joint,
the fourth joint allows independent rotation of the right seat about a second axis, the second axis being a straight line in a vertical direction that intersects the fourth joint,
a "lateral" direction meaning a direction that is parallel to a straight line segment that intersects the second joint and the fourth joint, and
a "vertical" direction and a "front/back" direction each being defined by a frame of reference that
is fixed relative to the seating system as a whole, and
has three axes, being vertical, lateral and front/back, respectively, the lateral axis being in a lateral direction, which three axes:
are perpendicular to each other, and
are oriented so that, when the lateral axis is horizontal from an external observer's point of view, the vertical axis is vertical from the external observer's point of view, the external observer's point of view being oriented so that up and down are along the direction of maximum gravitational force being exerted on the seating system.

2. The seating system of claim 1, wherein:
the second joint also allows independent rotation of the left seat about a third axis, the third axis being a straight line in a lateral direction that intersects the second joint, and
the fourth joint also allows independent rotation of the right seat about a fourth axis, the fourth axis being a straight line in a lateral direction that intersects the fourth joint.

3. The seating system of claim 1, wherein:
the first joint allows independent rotation of the left seat about a fifth axis, the fifth axis being a straight line in a lateral direction that intersects the first joint, and
the third joint allows independent rotation of the right seat about a sixth axis, the sixth axis being a straight line in a lateral direction that intersects the third joint.

4. The seating system of claim 1, wherein
the right and left seats are each elongated,
the first flexible member is adapted to flex to allow independent rotation of the left seat about a seventh axis, the seventh axis being parallel to the long dimension of the left seat, and
the second flexible member is adapted to flex to allow independent rotation of the right seat about an eighth axis, the eighth axis being parallel to the long dimension of the right seat.

5. The seating system of claim 1, wherein
the first flexible member is adapted to flex to allow independent translation of the left seat relative to the base in a vertical direction, and
the second flexible member is adapted to flex to allow independent translation of the right seat relative to the base in a vertical direction.

6. The seating system of claim 1, wherein:
the first and second joints and the first flexible support member, in combination, allow independent translation of the left seat relative to the base in a vertical direction, and
the third and fourth joints and the second flexible support member, in combination, allow independent translation of the right seat relative to the base in a vertical direction.

7. An item of furniture comprising the seating system of claim 1.

8. A seating system comprising, in combination:
a left seat,
a right seat,
a base,
a first elongate flexible support member having first and second longitudinal ends, the first flexible support member moveably connected to the left seat by a first joint at or adjacent to the first longitudinal end and to the base by a second joint at or adjacent to the second longitudinal end, and
a second elongate flexible support member having third and fourth longitudinal ends, the second flexible support member moveably connected to the right seat by a third joint at or adjacent to the third longitudinal end and to the base by a fourth joint at or adjacent to the fourth longitudinal end,
wherein:
surfaces of the left and right seats are adapted to be simultaneously sat upon by a single human, all of these surfaces together defining an entire seating surface of the seating system,
the entire seating surface may translate, without changing the displacement or orientation of any of the surfaces of the entire seating surface relative to each other, except displacement along the long axes of the first and second flexible support members, in a translation that is relative to the base, includes a lateral direction and—a vertical direction, and occurs solely as a result of internal movement of one or more of the first, second, third and fourth joints and the first and second flexible support members,
the term "internal movement" meaning, with respect to a specified joint, movement of at least one part of the specified joint relative to at least one other part of the specified joint, which movement comprises rotation about an axis that intersects the specified joint, and the term "internal movement" meaning, with respect to a specified flexible support member, flexing of the specified flexible support member,
a "lateral" direction meaning a direction that is parallel to a straight line segment that intersects the second joint and the fourth joint, and a "vertical" direction and a "front/back" direction each being defined by a frame of reference that
is fixed relative to the seating system as a whole, and
has three axes, being vertical, lateral and front/back, respectively, the lateral axis being in a lateral direction, which three axes:
are perpendicular to each other, and
are oriented so that, when the lateral axis is horizontal from an external observer's point of view, the vertical axis is vertical from the external observer's point of view, the external observer's point of view being oriented so that up and down are along the direction of maximum gravitational force being exerted on the seating system.

9. The seating system of claim 8, wherein:
the left seat may rotate in an independent rotation that is about a first axis and occurs solely as a result of internal movement of the second joint, the first axis being a straight line in a vertical direction that intersects the second joint, and
the right seat may rotate in an independent rotation that is about a second axis and occurs solely as a result of internal movement of the fourth joint, the second axis being a straight line in a vertical direction that intersects the fourth joint.

10. The seating system of claim 9, wherein:
the left seat may rotate in an independent rotation that is about a third axis and occurs solely as a result of internal movement of the second joint, the third axis being a straight line in a lateral direction that intersects the second joint, and
the right seat may rotate in an independent rotation that is about a fourth axis and occurs solely as a result of internal movement of the fourth joint the fourth axis being a straight line in a lateral direction that intersects the fourth joint.

11. The seating system of claim 8, wherein:
the left seat may rotate in an independent rotation that is about a fifth axis and occurs solely as a result of internal movement of the first joint the fifth axis being a straight line in a lateral direction that intersects the first joint, and
the right seat may rotate in an independent rotation that is about a sixth axis and occurs solely as a result of internal movement of the third joint the sixth axis being a straight line in a lateral direction that intersects the third joint.

12. The seating system of claim 8, wherein
the right and left seats are each elongated,
the left seat may rotate in an independent rotation that is about a seventh axis and occurs solely as a result of flexing of the first flexible member the seventh axis being parallel to the long dimension of the left seat, and
the right seat may rotate in an independent rotation that is about an eighth axis and occurs solely as a result of flexing of the second flexible member the eighth axis being parallel to the long dimension of the right seat.

13. The seating system of claim 8, wherein
the first flexible member is adapted to flex to allow independent translation of the left seat relative to the base in a vertical direction, and
the second flexible member is adapted to flex to allow independent translation of the right seat relative to the base in a vertical direction.

* * * * *